United States Patent [19]

de Vroom

[11] 4,451,522

[45] May 29, 1984

[54] TRANSFERABLE ENAMEL SHEET AND METHOD AND APPARATUS FOR ITS FABRICATION

[75] Inventor: Hubertus M. de Vroom, Warmond, Netherlands

[73] Assignee: Nordipa AG, Schwerzenbach, Switzerland

[21] Appl. No.: 315,295

[22] Filed: Oct. 27, 1981

Related U.S. Application Data

[63] Continuation-in-part of Ser. No. 205,301, Nov. 10, 1980, abandoned.

[30] Foreign Application Priority Data

Oct. 29, 1980 [NL] Netherlands ........................ 8005935

[51] Int. Cl.[3] .......................... B32B 3/18; B41M 3/14

[52] U.S. Cl. .................................... 428/201; 428/202; 428/352; 428/353; 428/354; 428/423.3; 428/447; 428/484; 428/515; 428/914

[58] Field of Search ................ 156/234, 240; 427/147; 428/40, 195, 201, 202, 207, 211, 343, 352, 354, 484, 486, 488, 537, 914, 203, 204, 353, 355, 423.3, 447, 515

[56] References Cited

U.S. PATENT DOCUMENTS 3,640,791 2/1972 Rosenheim .......................... 156/230
4,012,552 3/1977 Watts ................................. 428/200

FOREIGN PATENT DOCUMENTS 1232971 5/1971 United Kingdom ................ 428/914

*Primary Examiner*—Bruce H. Hess
*Attorney, Agent, or Firm*—J. David Dainow

[57] ABSTRACT

A transferable enamel sheet and the process for producing it is disclosed, which consists of a carrier film, a release layer applied thereon, a paint or enamel layer and an adhesive layer whereby a neutralization layer of wax-type consistency, preferably carnauba wax is applied to the release layer which is of the dimethyl-siloxane type (silicone). It is possible to preform two types of transferable enamel sheets. One of them is characterized by the adhesive layer between the neutralization layer and the paint or enamel layer. In this case the enamel paint itself is used as a removable coating, which can immediately be adhered to the surface to be touched up or painted. The other type is characterized by a buffer layer, preferably acrylic resin coated on the neutralization layer and by sharp defined enamel-characters being printed on the buffer layer with an adhesive layer on the outer side to transfer the characters to any surface.

22 Claims, 1 Drawing Figure

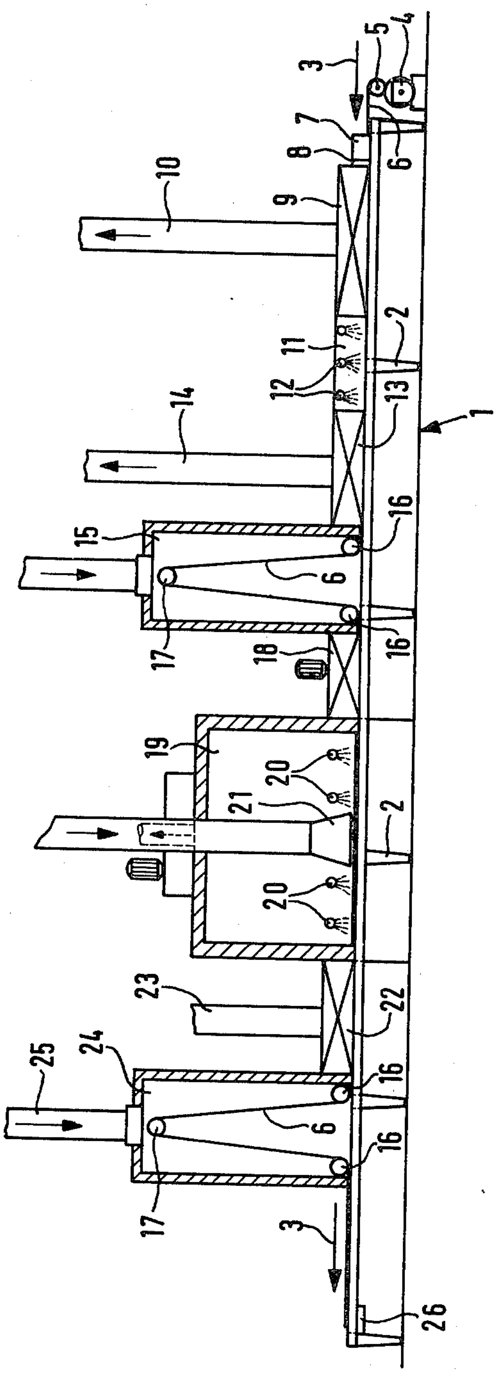
1
2
3
4
5
6
7
8
9
10
11
12
13
14
15
16
17
18
19
20
21
22
23
24
25
26

TRANSFERABLE ENAMEL SHEET AND METHOD AND APPARATUS FOR ITS FABRICATION

BACKGROUND OF THE INVENTION

The present invention relates to a transferable enamel sheet consisting of a carrier film, a release layer applied thereon, a paint or enamel layer, and an adhesive layer. This is a continuation-in-part of my co-pending application, Ser. No. 205,301 filed Nov. 10, 1980, now abandoned, the disclosure and claims of which are hereby incorporated by reference and attached hereto as Appendix I.

Such enamel sheets for enamel paint touch up work on motor vehicles have already been suggested in British patent specification No. 1,232,971. These known sheets provide a carrier film onto which is applied a release layer consisting of 23 parts nitrocellulose, 80 parts solvent, 2 parts plasticizer and 10 parts alkyd resin. After curing of this release layer, a nitrocellulose enamel is applied to that layer, which again, after curing, is provided with a standard pressure-sensitive adhesive. As described in this specification, the enamel sheet produced in this manner can be trimmed as required, placed on the motor vehicle with the adhesive coat facing downwards to cover the damaged painted area and adhered to it by means of applying pressure. Concerning this enamel sheet, the release layer remains facing the outside, while the front side is arranged below it.

Sheets of this type, however, have not been accepted in actual practice. For example, original automotive enamel paints cannot be used in accordance with the proposed method. So-called decalcomania materials disclosed in Dutch patent specification No. 123 093, consist of a transparent or translucent carrier film onto which characters are printed by means of the screen printing method. Such characters are suited only for indoor applications, such as marking of drawings or advertising materials.

Other similar transferable materials are also known, which are transferred under pressure applied for example by the tip of a pencil or a ball point pen as disclosed in German publication of the examined application No. 1 546 568 or German publication of the examined application No. 1 219 831; in the first case, however, the sequence of the layers is not as that described for the initially mentioned transferable enamel sheet. In the second case it is only important to so match the printing ink and the adhesive that a precise alignment with the base surface to be provided with the characters is possible when transferring the characters.

SUMMARY OF THE INVENTION

The present invention is based on the objective to so design and structure an enamel sheet of the initially mentioned type, (a) that no restrictions are encountered as to the enamel paint to be used, and (b) that, for example, original automotive enamel paints, regardless of their type, are available as dry material so that touching up of the original enamel paint as well as marking with the original enamel paint can be performed.

The problem is solved according to the invention by the application of a neutralization layer of wax-type consistency to the release layer. It was found that it is solely due to this layer that an absolute freedom with respect to the enamel paint to be applied can be achieved. The new sheet enables the known enamel paint touch up method to be carried out with original enamel paints but also with two-component or stove-enamels, which until now was only possible by painting or spraying and subsequent heat treatment at the motor vehicle itself. Even so-called metallic enamel paints can be employed, where it is important that the correct coat faces the outside and thus the viewer. The new enamel sheet permits a piece of original enamel paint in the dry condition to be carried in the vehicle so that touch up work can be performed, if required.

It was found to be particularly advantageous if the release layer is of the dimethyl-siloxane type (silicone). Due to its apolar properties, this layer is repellent to nearly any type of layer applied to it. In order to nevertheless enable the application of a well adhering, uninterrupted and smooth enamel layer, it is advantageous to provide a layer of carnauba wax as neutralization layer. This is preferably diluted by means of white spirit to a highly viscous substance and then immediately applied to the siloxane layer by means of a doctor blade. The disadvantage of the dimethyl-siloxane layer which, due to the occurring boundary layer stresses, is not suitable for accepting a low-viscosity material layer, is simply eliminated by interposing the neutralization layer. Due to the highly viscous state of the wax, a well wetted layer can be produced. A less viscous substance would produce a layer that is not sufficiently wetted because of the boundary layer stresses occurring in the release layer below, so that the enamel layer to be applied would consequently not adhere satisfactorily and uniformly.

In a chemical respect, the wax used consists of a mixture of branched and unbranched hydrocarbon chains with an average length of 30 carbon atoms and a COOH (acid) group at several places of the chain. The wax layer has a low cohesion and is therefore very thin. The adherence to the siloxane layer is sufficient, but low.

It was found that the new sheet coated with the wax-type neutralization layer can be used particularly advantageously and without any problems to produce a uniform, well adhering enamel paint layer, if it is provided with an adhesive layer before the application of the enamel paint layer, which adhesive is self-adhering and cures at normal temperatures, possesses a high adhesion to standard surface materials, such as metal and wood, and, after curing, a high degree of cohesion. This adhesive layer must be weather-resistant and, in addition, resistant against ultraviolet radiation. The composition of this adhesive and neutralization layer is so matched or compatible with the composition of the enamel paint and silicone layer that the neutralization layer is dissolved by the solvents added to the adhesive, however, without the adhesive contacting the silicone layer in such a liquidness that it would affect the uniform generation of the coating by the effects of boundary layer stresses. The enamel paint layer can then be satisfactorily applied to said adhesive layer.

If, for example, acrylate resin-base automotive enamel paint is provided, an adhesive acrylic resin is particularly suitable because of its affinity to the paint to be applied. In the low-viscous state, the adhesive layer is either sprayed onto the wax layer or, in the higher viscous state, applied by means of a doctor blade. Thus a transferable enamel sheet is produced which is particularly well suited for painting or touch up work on motor vehicles or other components. An enamel sheet of this structure has the advantage that the original enamel paint is available in solid sheet form and that it can be stored after its fabrication even at high temperatures without deterioration, for example in the summer in an automobile. The adhesive layer will not dry. The silicone layer will function as a preserving agent for the adhesive and also ensure satisfactory removal of the enamel paint and adhesive layers from the carrier film.

It is advantageous to develop a clear polyester film on the basis of polyethylene-terephthalate to serve as the carrier film. The carrier film must satisfy a number of requirements to be suitable for the enamel sheet in accordance with the invention. The carrier film or sheet, respectively, must, for example, have an extremely smooth surface. It must be of adequate resistance against the substantially aromatic solvents used in the other components of the transferable material or during its application and be stable at the temperatures prevailing in enamel drying or stove-enamelling processes, i.e. at temperatures ranging from 100° C. to 200° C. It was found that said polyester film meets these requirements. A film of such type is also advantageous in that original stove enamel can be applied, consisting of two components which react at 120° C. Optimum cross-linkage between the two enamel components will be achieved after approximately 20 minutes, the cross-linkage network generated provides the special advantages of stove-enamel. Until now, an enamel paint of such type could be applied to motor vehicles or the like only by means of the conventional paint touch up methods.

There are various possibilities of fabricating the novel enamel sheet. In each case a web-type carrier sheet will first be provided with the release layer in a suitable apparatus. The coated side of this web will then be provided with the neutralization layer of wax-type material. This layer will then be subjected to a drying process, and only then the additional layers will be applied. As already mentioned, it is possible to first apply an adhesive layer in the liquid state to the neutralization layer and to then subject this layer to a curing process, after which the enamel paint layer is applied.

This type of sheet is advantageous in that a separate protective film need not be provided. It is rather the enamel paint itself that is used as a removable coating which, after removal from the carrier film, can immediately be adhered to the surface to be touched up. This is also advantageous in that the original enamel paint layer which is otherwise only prepared on site can now be applied manually and in the dry process; a method which naturally offers considerable advantages with respect to the duration of the touch up work or the enamel paint marking procedure as well as other advantages. It is obvious that with such a way of handling, the thinner mist normally necessitated in the spraying process, is completely omitted so that the new method offers a high degree of environmental compatibility. It is also advantageous that the finished product shows neither brush traces nor tears, that the new dry-adhered original enamel paint is of course as suited for polishing as the sprayed-on paint, but still offers the advantage to permit storage at any place with minimum space requirements and correspondingly convenient shipment.

The application of an enamel paint as sharply defined symbols is somewhat more complicated, where such symbols are for examle to be applied by means of the screen printing method and are to be provided with adhesive on the side facing away from the wax layer in order to be transferred to the surface to be marked. It was found that sharply defined characters, figures or the like can only be printed on without any problems if the wax-type neutralization layer is coated with a buffer layer which may consist of an acrylic resin comprising the maximum possible quantity of solvents with apolar properties. This resin permits distribution and curing as a uniform layer above the wax layer. It partly dissolves the wax layer as it does the adhesive layer. After printing, this resin layer will be dissolved to the to the edges of the printed areas by the aggressive solvents of the enamel paint used for screen printing. The enamel paint curing time and the dissolution rate of the aggressive solvents shall be so matched that the enamel paint has cured before reaching the silicone layer.

The enamel sheet fabricated in accordance with the second method, where the adhesive layer is initially located on the outside, is particularly recommended for marking purposes or the like, where it is important that the enamel characters are first secured in a certain position before their final adherence. The advantage of an enamel sheet fabricated in accordance with the first method where, for example, multi-component enamel paints can be applied in exactly the same sequence as is desired for the finished product, cannot be realized to the same extent in the case of a sheet fabricated in accordance with the second method. Nevertheless it was found that enamel paint characters or figures can much easier be transferred by means of a sheet fabricated in accordance with the second method than it was possible with the previously used decalcomania materials. Until now, there was also no possibility to employ enamel paints. The symbols need not be transferred from the novel enamel sheet by means of special spattles or ball point pens which exert considerable pressure on the characters. The enamel paint symbols can be transferred from the novel sheet in an easy manner by pressing them on with a handkerchief or merely by hand. The symbols are applied, as known, by means of the screen printing method. The enamel paint symbols are not elongated or deformed when transferred, because in fact there is no adherence to the carrier film, but only a good holding power of the adhesive, so that with slight pressure the transfer can be realized easily and directly.

For the performance of the fabricating procedure for a sheet with the adhesive layer between carrier sheet and enamel paint layer, an apparatus is provided which is characterized by carrying and conveying ways for the carrier sheet and by application means associated with the carrying and conveying ways for applying the wax-type neutralization layer and the adhesive or enamel paint layer. It will be advantageous to provide the carrier sheet with the silicone layer to be applied at high temperatures, and then to wind it up to form rolls, with an unwinding mechanism being provided for the wound up carrier sheet already coated on one side with the release layer, said mechanism to be arranged upstream of the carrying and conveying ways. The carrier sheet will be so unwound by means of this unwinding mechanism that its uncoated side rests on the carrying and conveying ways. The sheet moved for example on a conveyor belt can then be passed through the various processing stations, whereby it can first be statically discharged and then be passed below a squeegee mechanism for applying the wax layer. After solidification of the wax through evaporation of the liquid and curing of this wax layer the adhesive layer can be applied. This can be done by means of squeegee mechanisms, but also advantageously suitable spraying means. The same applies to the enamel paint application, with drying compartments being provided for curing the processed sheet, and compartments being equipped with guide rollers for the carrier sheet aligned parallel to the carrying and conveying ways, at least one of which being arranged at a distance above the carrying and conveying ways so that the carrier sheet is caused to move upwards keeping the required space for the curing distance small in the running direction of the conveyor belt.

For the fabrication of a transferable enamel sheet of the second type, a similar apparatus can be employed. Since enamel sheets of the second type are primarily provided with enamel paint in the form of symbols, such as letters, figures or the like, a screen printing device can preferably be employed for the fabrication of such sheets, where after the application of the silicone release layer and the wax-type neutralization layer as well as the buffer layer, which may for example be an acrylic resin, the enamel paint is applied by means of the register device. This is advantageous in that the characters are sharply defined. The screen printing ink which will then be an acrylate paint contains aggressive solvents, and the acrylic resin layer and the wax layer will be dissolved precisely to the edges of the characters where the characters are printed on. Curing of the paint and dissolution capacity of the resin and wax layer are so matched that the paint will have cured to such a degree that the formation of dimples is avoided. After the application of the enamel paint symbols and their curing, the adhesive layer will also be applied by means of the register assembly so that the adhesive, an acrylate adhesive where acrylate paint is used, will be applied to all areas to which paint has been applied. A low adhesion primer is added to this acrylate adhesive to achieve good adhesion between adhesive and paint. These symbols can then be transferred very easily.

DESCRIPTION OF THE DRAWING & PREFERRED EMBODIMENT

In the following description practical examples of the embodiment of the composition of the individual characteristic layers are indicated and a practical example of the embodiment of an apparatus for carrying out the new fabrication method will be described with reference to a drawing. The drawing shows a schematic longitudinal section through a continuously operating apparatus by means of which both the adhesive layer and the enamel paint layer are sprayed on. As already mentioned, other application processes are also possible.

The drawing shows carrying and conveying ways 1, consisting of a longitudinal supporting frame 2 for a circulating conveyor belt not shown in detail which is moved in the direction of arrow 3. Above the carrying and conveying ways 1 being in the embodiment and approximately twenty times as long as they are wide, several means for processing the surface of a polyester sheet are provided. The sheet is wound up to form a roll 4 and unwound from said roll 4 via a reversing roller 5 onto carrying and conveying ways 1. The carrier sheet is made, for example, from a polyethylene-terephthalate-based, optically clear polyester film. This material meets all requirements for the fabrication of the enamel sheet in accordance with the invention. It has a very smooth surface, and is adequately resistant against the substantially aromatic solvents used in the remaining components of the transferable material or during its application; it is stable at the temperature prevailing in enamel drying or stove-enamelling processes, i.e. ranging from 100° C. to 200° C. It would, of course, also be possible to provide a polypropylene film which is not resistant against temperatures as high as those mentioned above. Longer curing times, however, would then have to be tolerated and, as previously mentioned, it would not be possible to apply original stove-enamel to the sheet.

In a previous processing step, said carrier sheet 6 has been provided on one side with a dimethyl-siloxane (silicone) layer. This layer serves as a release layer and ensures that the subsequently applied layers can be removed from the carrier film. Due to its apolar properties, this silicone layer is repellant against nearly any type of coating applied to it. With roll 4 would up the silicone layer is facing the inside. The reversal by means of roller 5 causes the silicone layer during its movement on carrying and conveying ways 1 to face upwards. Therefore, carrier web 6 with its uncoated side rests on carrying and conveying ways 1.

Due to the occurring boundary layer stresses, the silicone layer applied to carrier sheet 6 is not suitable for the immediate application of a low viscosity material layer. The applied material would contract to form drops. This also applies to enamel paints. In a first processing station 7 a static discharge of carrier sheet 6 will therefore be initially performed and then a wax-type layer, e.g. carnauba wax, will then be applied to the silicone layer of sheet 6 by means of a doctor blade 8, this wax-type layer being diluted with white spirit to a high viscous substance. The correspondingly diluted wax is directly applied to the siloxane layer by means of doctor blade 8. Because of the highly viscous condition of the wax, a uniformly wetted layer can be produced. A substance of low viscosity would not produce a uniformly wetted layer due to the previously mentioned boundary layer stresses. In a chemical respect, the wax used consists of a mixture of branched and unbranched hydrocarbon chains with an average length of 30 carbon atoms and a COOH (acid) group at several places of the chain. The wax layer shows low cohesion and is therefore very thin. The adherence to the siloxane layer is sufficient, but low. When moving in the direction of arrow 3, sheet 6 will then pass an evaporation zone 9 provided with a venting duct 10 which, in a manner not shown, extends from the installation site to the outside. Downstream of the evaporation zone where the wax applied to the siloxane layer is cured or dried to a certain degree, a spraying booth 11 is arranged in the practical example of the embodiment, in which is a self-adhesive resin to form the adhesive layer is applied to the wax layer be means of spraying nozzles 12. This adhesive, e.g. self-adhering acrylic resin, cures at normal temperatures and possesses a high adhesion to commonly used surface materials, such as metal and wood, and develops a high degree of cohesion after curing. The adhesive layer must be weather-resistant and in addition resistant against ultraviolet radiation. If acrylic resin is used, acrylic enamel paints can be applied. The self-adhesive resin is sprayed onto the wax layer in a low-viscous state, i.e., with a solid content of 25 to 30 $g/m^2$. By employing a spraying process, a high-gloss surface, smooth as a mirror can be obtained, which is particularly important if high-gloss enamel paints are to be applied later. After spraying, the adhesive will start floating on the wax layer, which results in a low degree of adherence to the wax layer.

The following would be a well suited adhesive composition:

100 parts elastomeric (acrylic acid ester) for producing good cohesion, 5 parts Cello glue 11 (technical hydroabietyl alcohol) for producing the adhesion, 0.2 parts Desmodur L—a solution of 0.2% isocyanate in 75% ethylacetate.

The Desmodur L fraction provides for the cross-linkage of the adhesive, thereby improving cohesion and thus weather resistance. The addition of isocyanate produces cross-linkages between the molecules, i.e. network formation through polymerization.

The above described adhesive composition is diluted with a solvent consisting of 70% aromatic hydrocarbons (technical toluene), 30% isoamylacetate.

Adhesive plus solvent result in a viscous liquid which cannot be sprayed. In order to make said liquid sprayable, a second solvent will be added consisting of 70 parts cleaning spirit to 30 parts glue. This solvent for making the glue sprayable evaporates very rapidly and gives the spraying solution good flow properties.

13 parts aliphatic hydrocarbons with a chain length of 12 to 16 and a boiling point of 170° C. The purpose of this additive is to prevent air-drying of the glue already during the spraying process, which would result in the formation of threads.

It is of course also possible to provide another process for the application of the adhesive layer in lieu of the spraying process, for example the squeegee process which, however, would necessitate to select another viscosity.

Next to this adhesive application device 11, another evaporation zone 13 with a venting duct 14 is provided. Sheet 6 will then enter a drying compartment 15 equipped with guide rollers 16 and 17 for carrier web 6. Guide roller 17 is arranged at such a distance above carrying and conveying ways 1, but aligned parallel to them, that the travelling distance of sheet 6 in drying compartment 15 is sufficient to allow rapid curing of the adhesive by the introduction of hot air.

In order to bring the still hot sheet to room temperature a cooling zone 18 is provided, before sheet 6 resting again on carrying and conveying ways 1 enters an enamel paint spraying facility 19 where a first enamel paint coat is applied by means of commonly used spraying nozzles which in the present case comprise supply tubes 20 with nozzles. These tubes are arranged transversely across carrying and conveying ways 1, with the coating being subjected to an intense hot air stream below a drying nozzle 21 in the practical example of the embodiment so that a second enamel paint coat can then be applied to the already precured enamel paint layer. All spraying nozzles 20 are surrounded in a known manner by an extraction housing exhausting the solvent vapours. It is quite obvious that two-component enamel paints or multi-layer paints can also be applied in the spraying booth. These enamel paints on carrier sheet 6 are then moved through an evaporation zone 22 with venting duct 23 into another drying compartment 24, which again is equipped with guide rollers and reversing rollers 16 and 17 as is drying compartment 15, which are aligned parallel to carrying and conveying ways 1 and cause carrier sheet 6 to move upwards while it is subjected to the hot air supply through duct 25. The arrangement of the two drying compartments 15 and 24, in which the sheet moves in an upward direction over certain distances, results in space saving for the overall facility in the feed direction 3. The sheet leaving drying compartment 24 is in the cured condition. It has an uninterrupted enamel paint layer which, depending on the temperatures selected in drying compartment 24 can, for example, correspond to the original automotive stove-enamel paint. A schematically indicated cutting device 26 performs cutting of the sheet to partial length and packing. The sizes required for paint touch up work can then be cut from these individual sheet lengths. The actual enamel paint layer will have the function of a continuous film which can be removed from carrier sheet 6 and adhered to the areas to be touched up with its adhesive layer by applying pressure.

It is, of course, also possible to punch strips or letters from the sheet, as it is likewise possible to already produce strips or letters or the like in the spraying booth by correspondingly masking the sheet. It is also possible to apply the enamel paints by means of other processes, for example by squeegee application or pouring or by rotating brushes. The example illustrated however, is advantageous in that it complies with the original application of automotive enamel paints so that at the completion of the fabrication process an original automotive enamel paint can be present on the sheet, which can then be applied any time in the dry procedure. In addition to its extraordinary weather resistance the novel enamel sheet is primarily advantageous in that the adhesive located below the enamel paint layer will not dry even after extended periods of time. The siloxane layer below it has a preserving function.

Reference should be made to the fact that a two-component acrylate enamel paint can be applied to the adhesive layer in the spraying booth, which will be extremely weather-resistant and, in a chemical respect, of high compatibility with the previously used adhesive. During the paint curing process which is substantially due to the cyanate-acrylate reaction, the paint will sufficiently penetrate the adhesive so that a mechanical bond between adhesive and paint layers will result. This anchoring effect between adhesive and paint layers will be improved further by the isocyanate as the second component of the enamel paint, which will react with the top layer of the glue which itself due to its low cyanate content, is not completely interlinked. In this manner, an unseparable adhesive/paint compound will be produced which subsequently permits the easy removal of the enamel layer from the carrier and thus contributes to handling the original enamel paint in a similar manner as an adhesive patch for touch up work, which up to now was not possible. The major advantage is, as already mentioned, that multi-component or multi-layer paints will have the same layer sequence as the originally sprayed automative parts so that for example also the orientation of metallic particles will be identical to that on the vehicle. The optical effect will therefore be maintained. With the known types of sheet, this effect would never be obtainable.

Sheets of the second type where a buffer layer, e.g. in the form of an acrylic resin, is applied to the wax layer and only then enamel paint and adhesive are applied, are preferably fabricated by the screen printing method, because generally sheets are involved from which individual symbols, such as letters or figures, strips or the like, are to be transferred. Accordingly, the adhesive can be so appled by means of the register assembly after printing of the enamel paint symbols that it is only present at those areas that are covered by enamel paint symbols.

What is claimed is:

1. In a transferable enamel sheet formed as a laminate including a carrier film, a silicone release layer applied thereon, an enamel layer and a pressure sensitive adhesive layer, the improvement of a neutralization layer of wax-like consistency applied to the release layer, said neutralization layer being comprised of a mixture of branched and unbranched hydrocarbon chains with an average length of 30 carbon atoms and a COOH group at several locations in the chain.

2. A transferable enamel sheet in accordance with claim 1 wherein said neutralization layer comprises a layer of carnauba wax.

3. A transferable enamel sheet in accordance with claim 1, wherein said carrier film comprises clear polyethylene terephthalate polyester film.

4. A transferable enamel sheet in accordance with any of claims 1, 2 or 3, wherein the composition of the adhesive layer comprises a solution capable of dissolving the neutralization layer.

5. A transferable enamel sheet in accordance with claim 4, wherein said enamel paint comprises automotive enamel paint.

6. A transferable enamel sheet in accordance with claim 5, wherein said enamel paint layer comprises acrylate resin-based automotive enamel paint and said adhesive layer comprises acrylate glue.

7. A transferable enamel sheet according to claim 1 wherein said adhesive and enamel layers both comprise cross-linking agents, and said cross-linking agents of said adhesive are co-reacted with the cross-linking agents of said enamel.

8. A transferable enamel sheet according of claim 7 wherein said cross-linking agents comprise isocyanate.

9. A transferable enamel sheet in accordance with claim 1 wherein said wax-type neutralization layer is covered by a buffer layer which is covered by the enamel layer covered by the adhesive layer.

10. A transferable enamel sheet in accordance with claim 9, wherein the enamel paint layer is applied to the buffer layer in the form of symbols, and the adhesive layer is applied to said enamel symbols in a shape which corresponds to that of the symbols.

11. A transferable enamel sheet in accordance with claim 10, wherein the adhesive is provided with a bonding primer for improved adherence to the enamel paint symbols, and the primer comprises a solution capable of dissolving the neutralization layer.

12. A transferable enamel sheet in accordance with claim 9, wherein the composition of the buffer layer is compatible with the composition of the enamel paint layer as well as the neutralization and silicone layer.

13. A transferable enamel sheet in accordance with claim 9 wherein said buffer layer is transparent.

14. A transferable enamel sheet in accordance with claim 9 wherein said buffer layer comprises an acrylic resin layer.

15. A transferable enamel sheet in accordance with claim 14, wherein said enamel paint layer comprises an acrylic resin-based enamel paint.

16. A transferable enamel sheet in accordance with claim 1, wherein said release layer comprises a long siloxane chain wherein the silicon atom is substituted with two methyl groups.

17. The transferable enamel sheet of claim 1 wherein the enamel layer is an enamel paint.

18. In a transferable enamel sheet formed as a liminate including a carrier film, a silicone release layer applied thereto, and enamel layer and a pressure sensitive adhesive layer, the improvement comprising a neutralization layer comprised of a mixture of branched and unbranched hydrocarbon chains, of wax-like consistency applied to said release layer.

19. In a transferable enamel sheet formed as a laminate including a carrier film, a release layer of silicone applied thereon, a layer of enamel paint, and a pressure sensitive adhesive layer, the improvement comprising a neutralization layer comprised of a mixture of branched and unbranched hydrocarbon chains of wax-like consistency applied to said release layer.

20. The transferable enamel sheet of claim 19, wherein said carrier film comprises a film of a synthetic resin.

21. In a transferable enamel sheet formed as a liminate including a carrier film, a release layer comprising a long siloxane chain wherein the silicon atom is substituted with two methyl groups, the release layer being applied thereon, a layer of an enamel paint and a pressure sensitive adhesive layer, the improvement comprising a neutralization layer comprised of a mixture of branched and unbranched hydrocarbon chains of wax-like consistency applied to said release layer.

22. The transferable enamel sheet of claim 21, wherein said carrier film comprises a film of a synthetic resin.

* * * * *